US008440972B2

United States Patent
Streuber et al.

(10) Patent No.: US 8,440,972 B2
(45) Date of Patent: May 14, 2013

(54) RADIATION DETECTOR WITH MICROSTRUCTURED SILICON

(75) Inventors: Casey T. Streuber, Tucson, AZ (US); Kent P. Pflibsen, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 932 days.

(21) Appl. No.: 12/546,799

(22) Filed: Aug. 25, 2009

(65) Prior Publication Data

US 2011/0049368 A1  Mar. 3, 2011

(51) Int. Cl.
*G01J 5/20* (2006.01)
*G01J 5/00* (2006.01)

(52) U.S. Cl.
USPC ..................... 250/338.4; 250/338.1

(58) Field of Classification Search ............... 250/338.4, 250/338.1
See application file for complete search history.

(56) References Cited

U.S. PATENT DOCUMENTS

| | | | | |
|---|---|---|---|---|
| 4,126,033 | A * | 11/1978 | Bartoli et al. | 374/44 |
| 5,113,076 | A * | 5/1992 | Schulte | 250/370.06 |
| 5,264,375 | A * | 11/1993 | Bang et al. | 505/330 |
| 5,583,338 | A * | 12/1996 | Goodwin | 250/338.4 |
| 6,050,722 | A * | 4/2000 | Thundat et al. | 374/121 |
| 6,777,680 | B2 * | 8/2004 | Morita et al. | 250/338.1 |
| 7,354,792 | B2 | 4/2008 | Carey, III et al. | |
| 8,058,615 | B2 * | 11/2011 | McCaffrey et al. | 250/338.4 |
| 2003/0111603 | A1 * | 6/2003 | Sone et al. | 250/338.1 |
| 2007/0176104 | A1 | 8/2007 | Geneczko et al. | |
| 2008/0230699 | A1 * | 9/2008 | Simelgor et al. | 250/338.1 |
| 2009/0140147 | A1 * | 6/2009 | Skidmore et al. | 250/338.4 |
| 2010/0038542 | A1 * | 2/2010 | Carey et al. | 250/338.4 |

OTHER PUBLICATIONS

Zhao, Yang et al., "Optomechanical Uncooled Infrared Imaging System: Design, Microfabrication, and Performance", Journal of Microelectromechanical Systems, (2002), vol. II, No. 2, pp. 136-146.
Hunter, Scott et al., "High Sensitivity 25um and 50um Pitch Microcantilever IR Imaging Arrays", Infrared Technology and Applications XXXIII, (2007), vol. 6542, pp. 1-13.
Yu, Xiaomei et al., "Design and Fabrication of a High Sensitivity Focal Plane Array for Uncooled IR Imaging", Journal of Micromechanics and Microengineering, (2008), pp. 1-8.
Huang, Zhihong et al., "Microstructured Silicon Photodetector", Applied Physics Letters, (2006), pp. 1-3.

* cited by examiner

*Primary Examiner* — David Porta
*Assistant Examiner* — Mindy Vu
(74) *Attorney, Agent, or Firm* — Renner, Otto, Boisselle & Sklar, LLP (57) ABSTRACT

A radiation detector includes material for absorbing incident radiation, and for providing a response to heating caused by the absorption of photons from the incident radiation. The radiation detector may include multiple pixels, each with one or more layers of absorbing material. The absorbing material may include black (microstructured) silicon, which has the advantage of being a good absorber of radiation in the short wave infrared (SWIR) wavelengths (as well as ultraviolet (UV) wavelengths and visible light wavelengths). The radiation detector may include multiple pixels, each separately responding to radiation incident on that pixel, and each including black silicon (as well as possibly other absorptive materials). The pixels of the detector may each have cantilevered attachment to a frame of the detector, with differences in coefficient of thermal expansion of materials of the pixels causing deflection of parts of the pixels due to heating from absorption of radiation.

11 Claims, 5 Drawing Sheets

RADIATION DETECTOR WITH MICROSTRUCTURED SILICON

BACKGROUND OF THE INVENTION

1. Technical Field of the Invention

The invention is in the field of devices for detecting radiation, such as infrared radiation.

2. Description of the Related Art

Detectors of radiation have often been limited in the types of radiation that can be detected, especially as regards infrared radiation and without resorting to cooled detectors. Accordingly, it will be seen that a need exists for improvements in the field of radiation detectors.

SUMMARY OF THE INVENTION

According to an aspect of the invention, a radiation detector includes plural pixels that absorb photons from incident radiation and provide a response to heating by absorption of the photons, and means for measuring the response of the pixels to the heating by absorption of the photons. The pixels each include black (microstructured) silicon.

According to another aspect of the invention, a radiation detector includes: a frame; and plural pixels within the frame. The pixels each have a cantilever attachment to the frame. Each of the pixels includes black (microstructured) silicon and at least one other material.

According to yet another aspect of the invention, a method of detecting shortwave infrared (SWIR) radiation includes the steps of: absorbing the SWIR radiation in a black (microstructured) silicon layer of a pixel of a detector; and detecting a response of the pixel to heating caused by the absorption of the SWIR radiation in the black (microstructured) silicon layer.

According to still another aspect of the invention, a radiation detector including: plural pixels that absorb photons from incident radiation and provide a response to heating by absorption of the photons; and means for measuring the response of the pixels to the heating by absorption of the photons. At least some of the pixels include at least one of black (microstructured) silicon or mercury cadmium telluride.

To the accomplishment of the foregoing and related ends, the following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various features of the invention.

DETAILED DESCRIPTION

A radiation detector includes material for absorbing incident radiation, and for providing a response to heating caused by the absorption of photons from the incident radiation. The radiation detector may include multiple pixels, each with one or more layers of absorbing material. The absorbing material may include black silicon, which has the advantage of being a good absorber of radiation in the short wave infrared (SWIR) wavelengths (as well as ultraviolet (UV) wavelengths and visible light wavelengths). The radiation detector may include multiple pixels, each separately responding to radiation incident on that pixel, and each including black silicon (as well as possibly other absorptive materials).

The response of the detector to heating may include any of a variety of responses. The pixels of the detector may each have cantilevered attachment to a frame of the detector, with differences in coefficient of thermal expansion of materials of the pixels causing deflection of parts of the pixels due to heating from absorption of radiation. The deflection of the cantilevered pixels caused by radiative heating may be measured or quantified by changes in electrical capacitance, or by optical methods. As a further alternative, the heating may cause changes in electrical resistance, which may be measured by a suitable electrical circuit.

Figure 1:
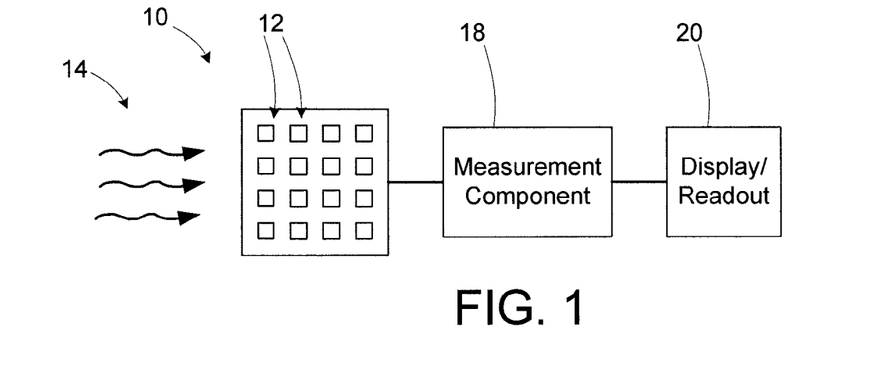
FIG. 1 is a schematic diagram of a radiation detector in accordance with an embodiment of the present invention.

Referring initially to FIG. 1, an overview is given of the operation of an electromagnetic radiation detector 10, also referred to herein merely as a "radiation detector." The radiation detector 10 includes plural pixels 12 that absorb infrared radiation 14. The absorbed infrared radiation causes heating of the pixels 12, which in turn causes some sort of measurable response in the pixels 12. The response is detected by a response measurement component 18, and may be displayed on a readout or display 20. It should be appreciated that certain aspects of the above general description of the radiation detector 10 are meant to be interpreted broadly. The response of the pixels 12 to heating from absorbing the infrared radiation 14 may take any of a variety forms, including deflection of parts of the pixels 12 and/or changes in electrical properties of parts of the pixels 12. The response measurement component 18 may take any of a wide variety forms, including electrical detection of the response and/or optical detection of the response. "Measurement" should also be interpreted broadly as detection and some sort of quantification (numerical or otherwise) of the response caused by the radiative heating. Measurement, as used here, is not limited to direct measurement of some discrete quantity. Finally, the readout or display 20 may take a wide variety of forms. Although the display 20 may provide a visual indication to a user, it will be appreciated that the readout or display 20 also may take the form of a machine-readable or other non-visual indication of the infrared radiation 14 received by the various pixels 12 of the radiation detector 10.

The pixels 12 may be arranged in an array, such as a rectangular array. The size of each pixel 12 may be approximately 50 microns by 50 microns, to give an example. It will be appreciated that a wide variety of other suitable sizes may be employed.

The pixels 12 may include black silicon a material that is formed by irradiating crystalline silicon with laser pulses in the presence of a gas containing sulfur hexafluoride or a chalcogen powder. For example, the formation technique may include using a series of 800 nm 100 fs laser pulses to irradiate a pure silicon (111) water at laser fluence levels of about 5 kJ/m² in the presence of $SF_6$ gas or a surface layer of chalcogen powder. This treatment produces a microscopic structure of cones on the surface of the silicon, with incorporated chalcogen dopants. The cone shape and size can be varied via the parameters discussed above, but a typical microstructured cone may be about 50 microns in height, about 2-4 microns in diameter at the base, and spaced about 2-4 microns apart. Black silicon has the advantage of absorbing infrared radiation that is not absorbed by untreated silicon. In particular, black silicon is able to absorb short wave infrared (SWIR) radiation, which may be defined as radiation having wavelengths from 1.1 to 2.5 microns. Sulfur-doped black silicon has greater than 90% absorption for infrared radiation out to wavelengths of 2.5 microns.

Although microstructred (black) silicon is good at absorbing SWIR radiation (>90%), it is not good at creating a usable electrical signal out of the absorbed photons in this region of the electromagnetic spectrum. While the phenomenon that causes the poor responsivity in a high photon absorption region is unknown, it has been suggested that black silicon contains a significant number of defect sites that likely trap charge carriers that have been photo-generated.

Figure 2:
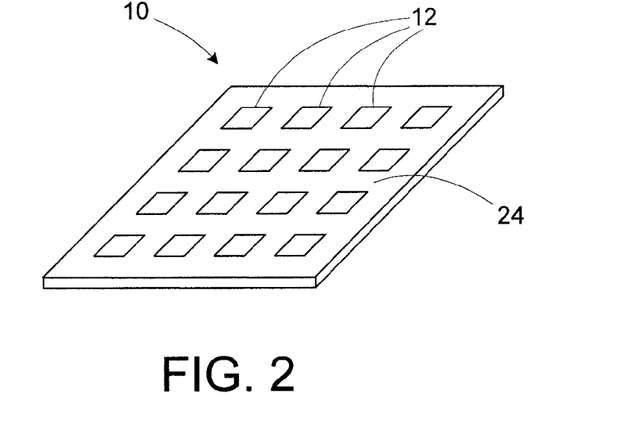
FIG. 2 is a view schematically showing part of a radiation detector having pixels with a cantilever attachment to a frame, in accordance with an embodiment of the present invention.

With reference now to FIG. 2, one embodiment of the radiation detector 10 has the pixels 12 attached to a frame 24 of the detector 10 with a cantilever arrangement. The frame 24 provides a stable anchor for the pixels 12, as the pixels 12 are heated and bend or deform relative to the frame 24. The frame 24 may be made of crystalline silicon.

Figure 3:
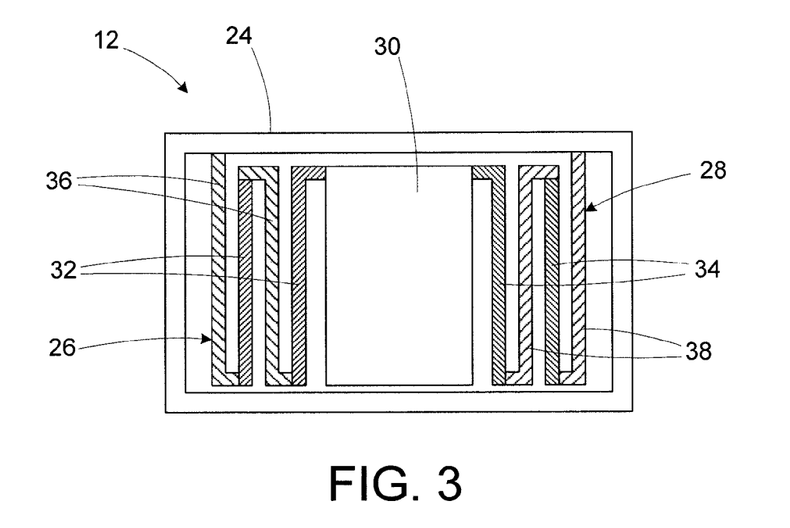
FIG. 3 is a plan view of a pixel of the detector of FIG. 2.

With reference now in addition to FIG. 3, the pixels 12 are each attached to the frame 24 by pairs of arms 26 and 28. The arms 26 and 28 attach a radiation absorption pad 30 of the pixel 12 to the frame 24. The arms 26 and 28 have respective bimaterial thermal response portions 32 and 34, as well as respective isolation portions 36 and 38. The arms 26 and 28 may have serpentine shapes, with the bimaterial portions 32 and 34 alternating with the isolation portions 36 and 38. The bimaterial portions 32 and 34 are made of stacked layers of different materials having different coefficients of thermal expansion. When heated, the difference in the coefficients of thermal expansion cause bending in the bimaterial portions 32 and 34. A bimaterial portion is defined herein as having materials with at least a difference of $1 \times 10^{-6}$ m/m/K in coefficients of thermal expansion. It will be appreciated that the larger the difference in coefficient of thermal expansion between the materials, the greater the response. Thus the difference in coefficients of thermal expansion is typically about $10 \times 10^{-6}$ m/m/K.

In contrast, the isolation portions 36 and 38 do not have different materials with different coefficients of thermal expansion. The isolation portions 36 and 38 may be made of either a single material, such as one of the materials used in the bimaterial portions 32 and 34, or of multiple materials having the same (or very similar) coefficients of thermal expansion. The arms 26 and 28 may each have respective pairs of the bimaterial portions 32 and 34. The pairs of bimaterial portions 32 and 34 may be configured to bend in similar amounts when heated.

Incident infrared radiation 14 that hits the absorption pad 30, and that is of a wavelength absorbed by the material of the absorption pad 30, is absorbed by and heats the absorption pad 30. This heat is transmitted by conduction from the absorption pad 30 to the arms 26 and 28. Heating in the arms 26 and 28 means heating in the bimaterial portions 32 and 34, which results in deflections in the bimaterial portions 32 and 34. This in turn causes movement of the absorption pad 30, relative to the frame 24, such as a tilt with respect to the plane defined by the absorption pad 30 in a relaxed state. This is illustrated in FIGS. 4 and 5, with FIG. 4 showing the position prior to heating, and FIG. 5 showing condition of the pixel 12 after heating has occurred.

Figure 4:
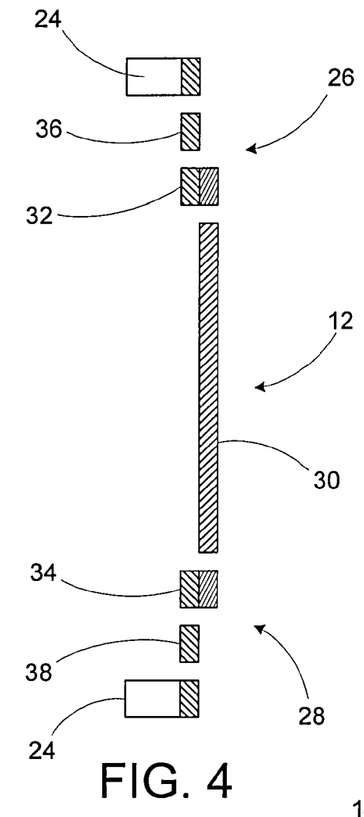
FIG. 4 is a cross-sectional view of a pixel of the detector of FIG. 2, in an unheated state.
Figure 5:
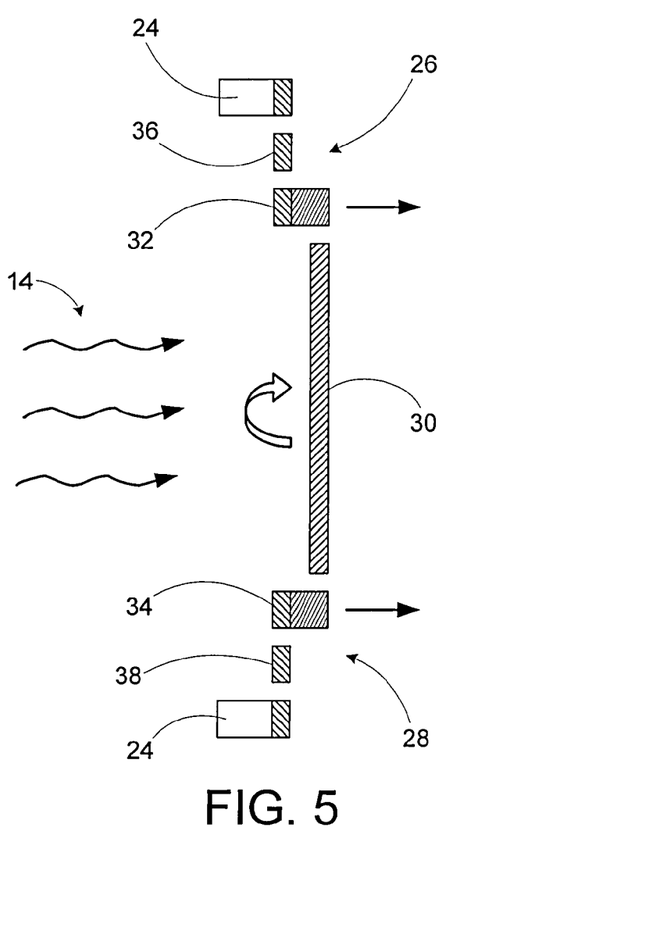
FIG. 5 is a cross-sectional view of a pixel of the detector of FIG. 2, in a heated state.
Figure 6:
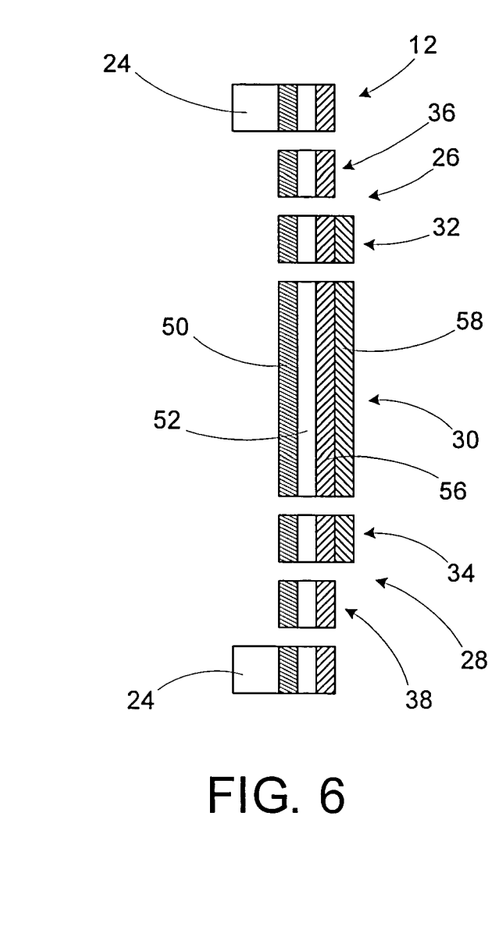
FIG. 6 is a cross-sectional view showing layers of one embodiment of the pixel of FIG. 3.
Figure 7:
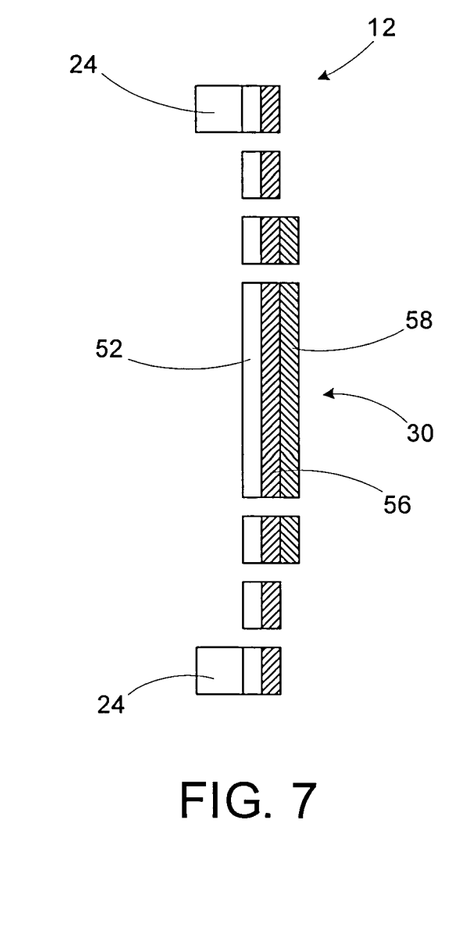
FIG. 7 is a cross-sectional view showing layers of a second embodiment of the pixel of FIG. 3.
Figure 8:
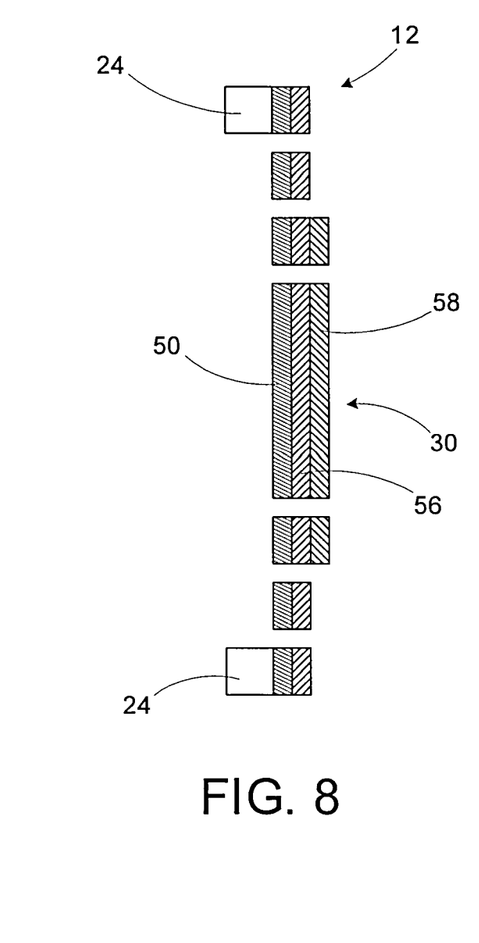
FIG. 8 is a cross-sectional view showing layers of a third embodiment of the pixel of FIG. 3.

FIGS. 6-8 show some possible configuration of various parts of the pixels 12 of FIGS. 3-5. FIG. 6 shows configuration of parts of a pixel 12 of an all-band detector, capable of absorbing a wide range of incident radiation, including ultraviolet (UV) radiation, visible light, and infrared radiation of various types, such as long wavelength infrared (LWIR) radiation, medium wavelength infrared (MWIR) radiation, and short wavelength infrared (SWIR) radiation. SWIR is nominally considered to be in the range of about 1.1 um-2.5 µm, MWIR is in the range of about 3-5 µm, and LWIR is in the range of about 8-12 µm. In the absorption pad 30, incident radiation first hits a black silicon layer 50 on the surface (front face) of the pad 30 that faces the incident radiation 14. The black silicon layer 50 absorbs UV radiation, visible light, and SWIR radiation. Below the black silicon layer 50 is a mercury cadmium telluride (HgCdTe) layer 52. The HgCdTe layer 52 is suitable for absorbing MWIR radiation. The next layer down is a silicon nitride (SiNx) layer 56. The silicon nitride layer 56 absorbs LWIR radiation. Finally, backing the layers 50, 52, and 56, is a gold layer 58 on a back face or surface of the pad 30. The gold layer 58 has a high thermal conductivity, which advantageously allows for rapid conduction of heat from the pad 30 to the arms 26 and 28. The radiation absorbing layers 50, 52, and 56 have low thermal conductivity, which ensures thermal isolation from the frame (substrate) 24. The gold layer 58 also may be used to provide structural support for the pad 30. Further, the gold layer 58 may be used for optical detection of response of the pixel 12 to radiative heating, as described further below.

The gold or other reflecting layer 58 may have a thickness of about 0.5 µm on the arms, and about 50 nm thick on top of the absorbing layers 50, 52, and 56. The absorbing layers 50, 52, and 56 may each have a thickness of about 1 µm. It will be appreciated that these thicknesses are just examples, and that other suitable thicknesses may be utilized.

A wide range of the incident radiation 14 can be absorbed in the pad 30. UV radiation, visible radiation, and SWIR radiation is largely absorbed by the black silicon layer 50, while MWIR and LWIR radiation largely passes through unabsorbed. MWIR radiation is absorbed by the underlying HgCdTe layer 52, while LWIR radiation passes through to the SiNx layer 56, where the LWIR radiation is absorbed.

Other parts of the pixel 12 shown in FIG. 6 may have one or more of the layers 50-58 omitted, in order to achieve different effects. The bimaterial portions 32 and 34 of the arms 26 and 28 retain the gold layer 58. Gold has a high coefficient of thermal expansion, while the other layers 50, 52, and 56 have low coefficients of thermal expansion. On the other hand, the gold layer is omitted from the isolation portions 36 and 38, since those portions are configured to not deform in response to heating. Heating from absorption of radiation at the pad 30 will cause deformation of the bimaterial portions 32 and 34, which results in movement of the pad 30 relative to the frame 24.

The arms 26 and 28 are anchored to the frame 24. In FIG. 6 the frame 24 is represented as a pair of crystalline silicon anchors. It will be appreciated that the portions of the frame 24 shown in FIG. 6 may be parts of a monolithic unitary frame 24.

The pixel 12 may be substantially identical to other pixels of the display 10 (FIG. 1). The various layers of the pixel 12 may be formed by suitable known processes, such as described above, or by patterned deposition of material, for example utilizing physical vapor deposition or chemical vapor deposition (CVD), or by molecular beam epitaxy (MBE) growth techniques. For instance, black silicon may be produced as described above, on an initially clean silicon substrate. Other layers may be deposited using low-pressure CVD, and HgCdTe may be produced using MBE.

FIG. 7 shows an alternative configuration for the pixel 12, in which the black silicon layer 50 (FIG. 6) is omitted, leaving only the HgCdTe layer 52, the SiNx layer 56, and the gold layer 58. The configuration shown in FIG. 7 operates as a detector for MWIR and LWIR radiation, while substantially not absorbing UV radiation, visible light, and SWIR radiation. In other respects the configuration shown in FIG. 7 is similar to that shown in FIG. 6.

FIG. 8 shows another alternative pixel configuration 12, which functions a detector for UV radiation, visible light, and SWIR and LWIR radiation. In the configuration in FIG. 8 the HgCdTe layer 52 is omitted, leaving the black silicon layer 50 and the SiNx layer 56 as the radiation-absorbing layers of the pad 30.

It will be appreciated that alternative materials may be used for some or all of the layers shown in FIGS. 6-8. For example, the gold layer 58 may be replaced by an aluminum or indium layer, or alternatively by any of a variety of metal layers. Suitable metals for substituting for gold would preferably have a high coefficient of thermal expansion and (if an optical readout is used) a high reflectivity at the desired optical readout wavelength.

Another characteristic/alternative is that the arms 26 and 28 may have isolation portions 36 and 38 that are made of a single material, such as SiNx, or of multiple materials, such that the thermal conductance of the isolation portions 36 and 38 are less that about 10 W/(m·K). Having the isolation portions 36 and 38 made with low thermal conductivity material helps provide thermal isolation, thermally isolating the bimaterial regions 32 and 34 from the frame (substrate) 24.

An alternative is to configure a detector with spatially separate pixels that measure the SWIR, MWIR, LWIR, and visible spectrum simultaneously. In essence this would be a "super pixel" that includes three (or more) cantilevered (sub) pixels, all with a different absorption layer, such as one with black silicon, one with HgCdTe, and one with SiNx. Each sub-pixel contains a different absorptive layer, which may have the same dimensions of a traditional cantilevered pixel discussed above. In such an arrangement stacking of multiple material absorptive layers is avoided, thus achieving more sensitivity for each layer and still obtain coverage of all of the spectral bands. Some spatial resolution is lost, but this and its various configurations would achieve coverage of multiple spectral bands without the reduction of sensitivity, manufacturing complexities of layering multiple materials, and susceptibility to delamination of pixel layers due to mismatches in CTE. A separate sub-pixel may include a crystalline Si layer, which gives the ability to determine UV/visible spectrum response alone since it will not include response in the SWIR like the black silicon layer would.

Figure 9:
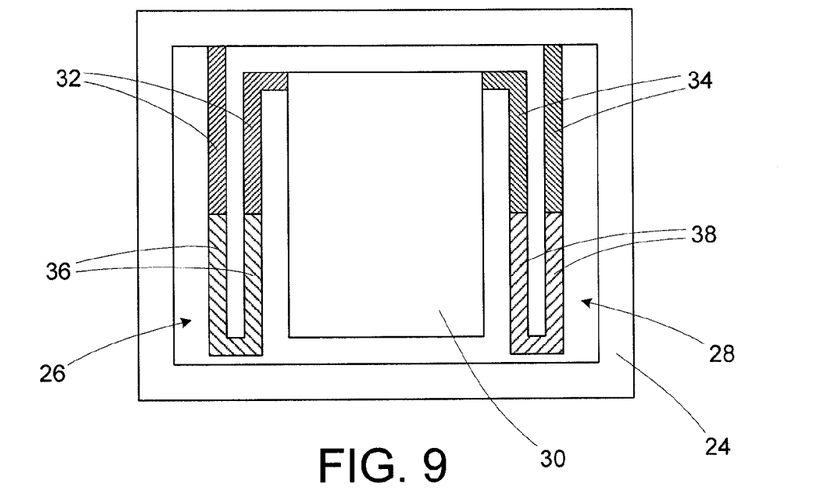
FIG. 9 shows a plan view of an alternate embodiment pixel that may be used as part of the detector of FIG. 2.

FIG. 9 shows an alternative configuration for the arms 26 and 28, with the arms 26 and 28 attached to corners of the pad 30, and extending away from the pad 30. The arms 26 and 28 double (bend) back on themselves, attached at anchors of the frame 24. Each of the halves of the arms 26 and 28 each have a bimaterial portion 32/34 and a thermal isolation portion 36/38.

Figure 10:
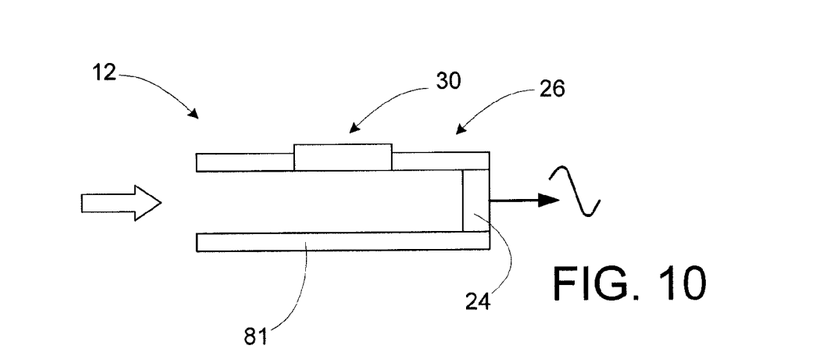
FIG. 10 schematically illustrates the connection of a pixel of the detector to a capacitance measurement unit, with the pixel in an unheated condition.
Figure 11:
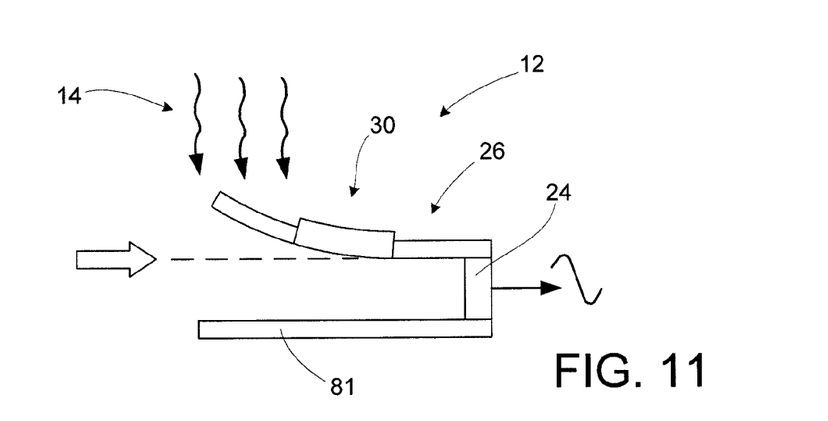
FIG. 11 schematically illustrates the pixel of FIG. 10, with the pixel in a heated condition.
Figure 12:
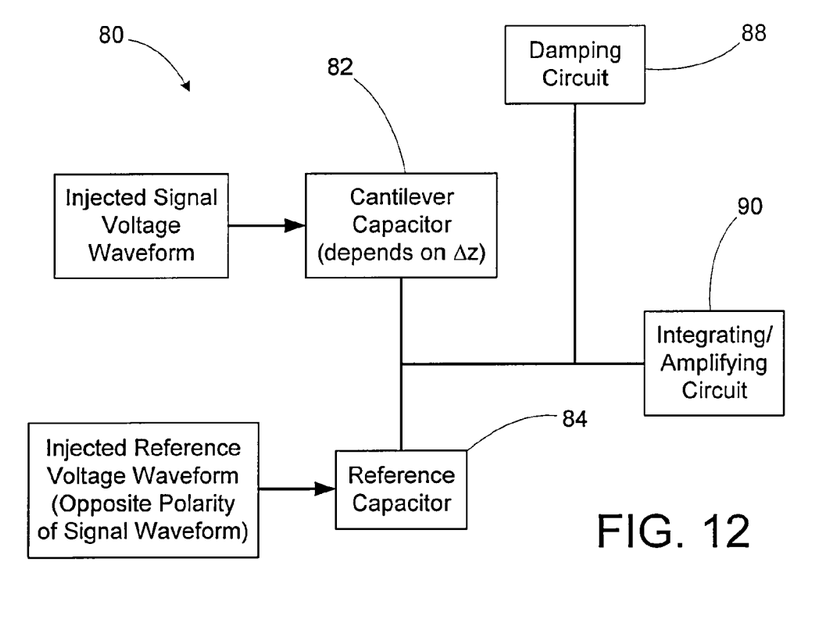
FIG. 12 is a high-level circuit diagram of the capacitance measurement unit of FIGS. 10 and 11.

FIGS. 10-12 schematically illustrate one method of reading the response of the pixels 12, a capacitance measurement method that detects changes in capacitance that occur when the pad 30 absorbs radiation 14. The pixel 12 has an interconnection to a capacitance measurement unit 80, as does a fixed capacitor electrode 81. The capacitance measurement unit 80 measures capacitance across the space between the pixel 12 and the fixed electrode 81. As the cantilevered pixel 12 moves as a result of heating from radiation absorption, as shown from the change in position from FIGS. 10 to 11, the capacitance across the space between pixel 12 and the fixed electrode changes.

FIG. 12 shows a high-level circuit diagram of the capacitance measurement unit 80 derived from prior art. Input from a cantilever capacitance sensor 82 is compared with a bridge reference capacitance 84. The output from the capacitances 82 and 84 is acted on by a damping resistor 88, which may be used to damp out any oscillatory ringing between the voltage pulses of the capacitance sensor 82 and the reference capacitance 84. The output then passes through an amplifier 90.

Figure 13:
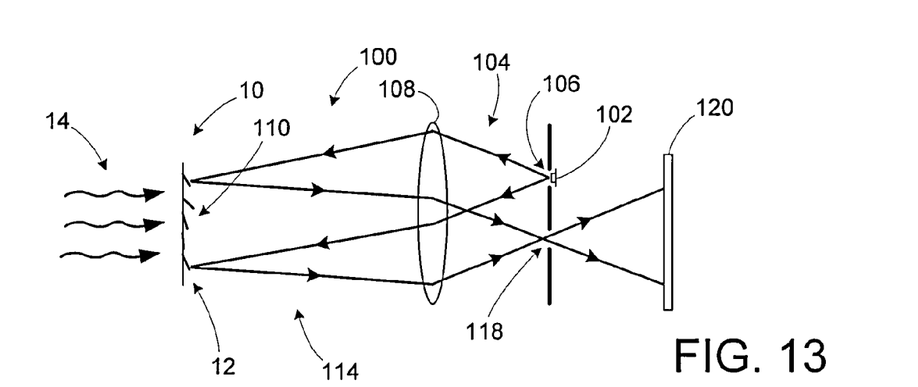
FIG. 13 is a side view of one embodiment of the detector of the present invention with an optical measurement system.

FIG. 13 shows an alternative response measurement system for the detector 10, an optical readout system 100 for optically reading the response of the cantilever pixels 12, also derived from prior art. The optical readout system 100 includes a light source 102, such as a light emitting diode (LED), that passes light 104 through a pin hole 106 and a lens 108, and to back surfaces 110 of the pixels 12. The light 104 reflects off of the back surfaces 110, and the reflected light 114 passes through the lens 108 and an aperture 118, to reach a charge-coupled device (CCD) or other light detector 120 for converting incident light to electrical signals. The location of the reflected light 114 incident on the CCD or other detector 120 allows determination of movement of the pixels 12 in response to heating from absorption of the radiation 14 incident on the front surfaces of the pixels 12 (incident on the radiation-absorptive pads of the pixels 12). The CCD 120 detects the degree of tilt in the pixels 12 due to the incident radiation. It does this by measuring a reduction in signal that is related to the angle at which the LED Illuminator's rays are reflected from the gold layer of the pixels 12 and subsequently sampled by the spatial frequency filter (pinhole aperture) via Fourier imaging theory. This method uses the pinhole aperture 118 at the focal point of the collector lens 108.

Figure 14:
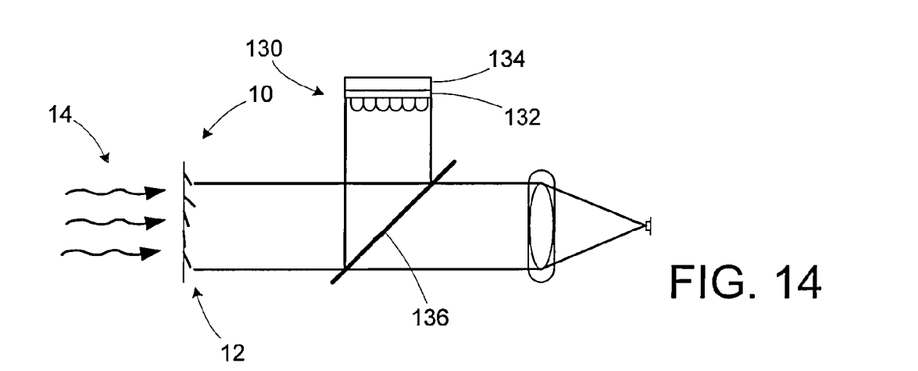
FIG. 14 is a side view of another embodiment of the detector of the present invention with an optical measurement system.

FIG. 14 shows a variation in the optical readout system 100, with the system using a wavefront sensor 130, such as Shack-Hartmann wavefront sensor. The wavefront sensor 130 includes an array of lenses (lenslets) 132 of the same focal length. Each of the lenses 132 is focused onto a photon sensor 134, such as a CCD array or quad-cell. The local tilt of the wavefront of the reflected light 114 across each of the lenses 132 can be calculated from the position of the focal spot on the corresponding sensor 134. Light is diverted to the wavefront sensor 130 using a beam splitter 136.

Another alternative mechanism for measuring response of the pixels to radiative heating is by measurement of changes in electrical resistance. Such methods are known from bolometers. In such an arrangement the absorptive pad 30 (FIG. 3) may have the layers shown in the various embodiments shown in FIGS. 6-8 and described above. It will be appreciated that resistance measurement of the response of the detector 10 (FIG. 1) does not require any sort of cantilever connection of the pixels (FIG. 1). This is because changes of electrical resistance are a separate effect from changes in position of parts of the pixels.

The detection of the response of the detector 10 to incident radiation may be displayed, recorded, and/or utilized in any of wide variety of ways. The response may be visually displayed, for instance in a heads-up display or in goggles worn by an individual. Such a display may allow improved visualization of objects. Another possibility is use in targeting systems for weapons, such as missiles. Providing detection of targets emitting widely different ranges of wavelength allows detection of targets having widely different temperatures. SWIR radiation is emitted by hot targets, with MWIR radiation emitted by targets on the order of 500K, and LWIR radiation emitted by cooler targets, such as those at around room temperature.

The detector 10 (FIG. 1) described above in various embodiments, has many advantages. It is able to detect a wide range of wavelengths of radiation, potentially from UV to LWIR. Resolution is good even at SWIR wavelengths, and the detector 10 may be able to achieve a noise equivalent temperature change (NEdT) of 50 mK or better at reasonable object temperatures.

The detector 10 is uncooled, meaning less weight, expense, and complication, compared with detectors that require cooling systems. In addition, it will be appreciated that optical readouts such as those described above have the advantages of not requiring an electrically complex readout, and of being able to be thermally isolated from the pixels. In addition, spatial resolution of the optical readout system is better when the wavefront detector is utilized. The increased resolution of local wavefront tilt, leads to better dynamic range with this optical readout configuration than the traditional pinhole filter technique that limits the maximum angular pixel deviation that can be recorded.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radiation detector comprising:
   a frame;
   plural pixels that absorb photons from incident radiation and provide a mechanical response to heating by absorption of the photons; and
   means for measuring the mechanical response of the pixels to the heating by absorption of the photons;
   wherein the pixels are within the frame and the pixels each include
      a pad for absorbing the incident radiation, wherein the pad comprises a first layer of black (microstructured) silicon, a second layer of mercury cadmium telluride, and a third layer of silicon nitride; and
      a pair of arms that attach the pad to the frame; wherein each arm includes at least one bimaterial portion adjacent to at least one isolated portion such that the bimaterial portion comprises a stacked layer of different materials with different thermal coefficients that deflect upon heating due to different coefficients of thermal expansion of the materials of the bimaterial portion, and the adjacent isolated portion comprises a single material or multiple materials with similar thermal coefficients.

2. The detector of claim 1, wherein the pixels each have a cantilever attachment to the frame.

3. The detector of claim 1,
   wherein the black (microstructured) silicon is on a front face of the pad; and
   wherein the pad further includes a metal layer on a back face of the pad.

4. The detector of claim 3, wherein in the metal layer includes at least one of gold or aluminum.

5. The detector of claim 1, wherein the means for measuring response includes means for measuring capacitive electrical response to the heating.

6. The detector of claim 1, wherein the means for measuring response includes means for measuring resistive electrical response to the heating.

7. The detector of claim 1, wherein the means for measuring response includes optical means for determining movement of the pixels in response to the heating.

8. The radiation detector of claim 1, wherein each arm further comprises the bimaterial portion alternating with the isolated portion.

9. A radiation detector comprising:
   a frame; and
   plural pixels within the frame;
   wherein the pixels each have a cantilever attachment to the frame;
   wherein the pixels each include
      a pad for absorbing the incident radiation, wherein the pad comprises a first layer of black (microstructured) silicon, a second layer of mercury cadmium telluride, and a third layer of silicon nitride; and
      a pair of arms that attach the pad to the frame; wherein each arm includes at least one bimaterial portion adjacent to at least one isolated portion such that the bimaterial portion comprises a stacked layer of different materials with different thermal coefficients that deflect upon heating due to different coefficients of thermal expansion of the materials of the bimaterial portion, and the adjacent isolated portion includes a single material or multiple materials with similar thermal coefficients.

10. The radiation detector of claim 9,
   wherein the black silicon is on a front face of the pad; and
   wherein the pad further includes a metal layer on a back face of the pad.

11. The radiation detector of claim 9, wherein each arm further comprises the bimaterial portion alternating with the isolated portion.

\* \* \* \* \*